July 18, 1933.  U. K. JOHANNSEN  1,918,846
RADIATOR SHUTTER
Filed Dec. 30, 1931  2 Sheets-Sheet 1

INVENTOR
Udo K. Johannsen.
BY Louis Illmer
HIS ATTORNEY

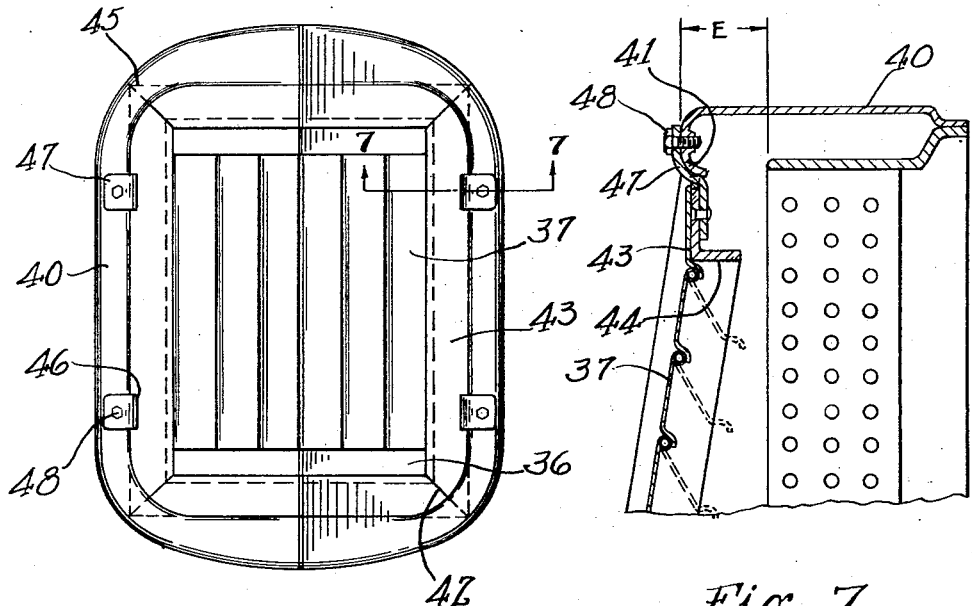

Patented July 18, 1933

1,918,846

UNITED STATES PATENT OFFICE

UDO K. JOHANNSEN, OF CORTLAND, NEW YORK, ASSIGNOR TO THE BREWER-TITCHENER CORPORATION, OF CORTLAND, NEW YORK, A CORPORATION OF NEW YORK

RADIATOR SHUTTER

Application filed December 30, 1931. Serial No. 583,938.

This invention relates to improvements in the art of operable cold-weather shields or shutter fronts adapted to control air-flow to a radiator core for water-cooled vehicle motors, and is more particularly directed to a sectional shutter framework of the attachable type that can readily be superimposed ahead of a conventional core housing shell in a fashion that enhances the appearance of the vehicle to which it may be applied and that permits of easily demounting said framework to unobstructedly expose the core to a free flow of cooling air during the warm weather season.

The object of my invention is to provide for a simple and smartly designed automobile, bus or truck accessory of the character indicated and one that can be compactly mounted wholly inward of the foremost vertical face of the shell housing without requiring extensive changes in the structure of a regular style of shell housing where this extends some distance ahead of the front core face. My present shutter design is such that it can be economically fabricated to meet heavy-duty service in special odd frame shapes where but comparatively few shutter assemblies of any given size are likely to be needed.

Said improvements further consist in other novel structural and frame fastening features, in a method for making a decorative shutter frame, also in providing for special frame shapes designed to achieve stream-line body effects as applied to automobiles of the front-wheel drive type, and all of which will hereinafter be disclosed in detail. Reference is had to the accompanying three sheets of drawings which are illustrative of specific embodiments of my invention, and in which drawings:

Fig. 1 is an elevational front view of my preferred shutter frame assembly as attached to an automobile radiator shell that is kept spaced ahead of the core face, while Figs. 2 and 3 represent a vertical and a fragmental horizontal sectional view as respectively taken along lines 2—2 and 3—3 of Fig. 1.

Fig. 6 illustrates an elevational front view of a modified shutter frame assembly of the simulated V type that is more especially intended to cooperate with bus and truck radiator shells.

Figure 1:
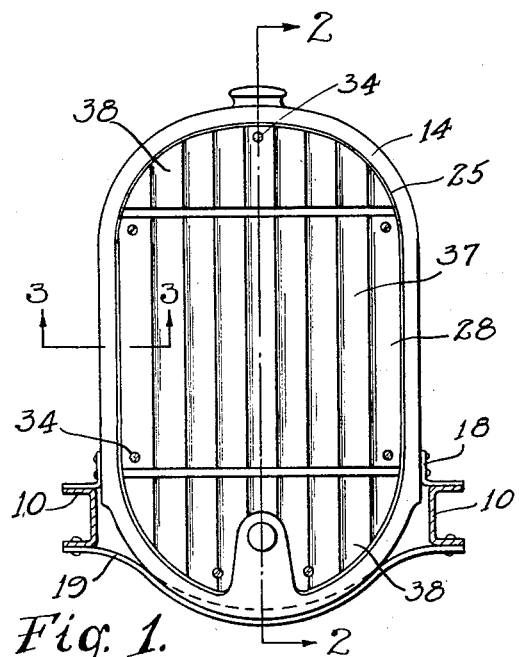

Fig. 7 details the corresponding heavy-duty attachment devices as taken along the sectional line 7—7 of Fig. 6.

Referring first to Figs. 1 to 5 inclusive, they collectively show a relatively light-weight shutter assembly that is applicable to passenger automobiles and which installation is conventionally associated with a pair of spaced chassis beams 10, a honeycomb or equivalent relatively thin cellular radiator core 11 of rectangular shape, an upper radiator tank 12 and a lower tank 13 which are housed within a regular radiator shell 14.

In this illustrative disclosure, the front core face 15 is kept flat but it may also be given a different profile. Said shell is preferably of the regular stamped-up type having a main housing wall 14A and an integral inturned trim flange 17 that is disposed ahead of said core face to provide for the housing extension space designated as "E". The shell housing may be secured to the chassis beams by means of complementary brackets 18. Said beams may in turn be securely cross-braced by the depending saddle strap 19 which reaches beneath the lower tank and is reenforced through the support arm 20. The rearward transverse edge of the main housing wall may be inset to constitute a conventional hood-receiving recess 21. The top and complementary end faces of the core 11 may be protected by a band or strap portion 22, the rearward edge of said strap being offset at 23 for cooperative attachment to the shell recess 21, as shown in Figs. 2 and 3.

The shell trim flange has an air-flow opening 24 therethrough which it is the purpose of my device to control by operable shutter means. The inturned flange edge that defines the shell opening is preferably impressed to provide for an endless marginal bead 25 adapted to overlappingly cooperate with the correspondingly shaped flange perimeter of my shutter frame.

Figure 2:
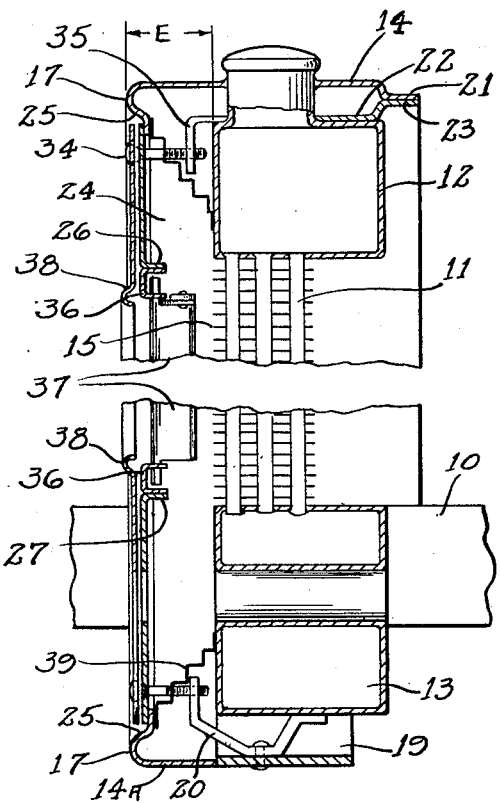
Figure 4:
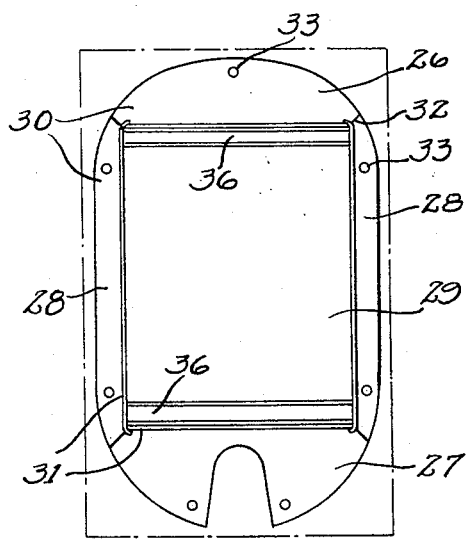
Fig. 4 shows a rear view of such shutter assembly and Fig. 5 an enlarged corner detail thereof.
Figure 3:
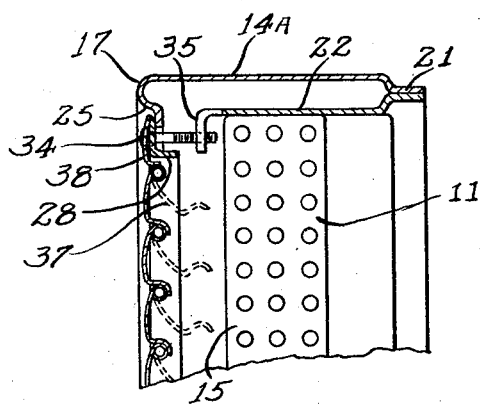
Figure 5:
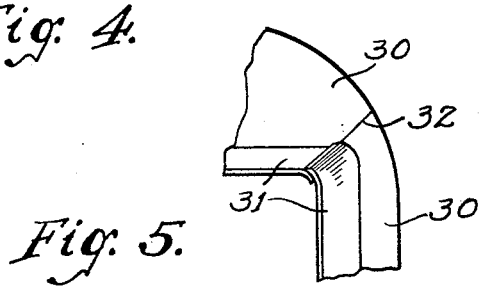

Referring in detail to Figs. 2 and 4, this particular style of built-up, endless shutter frame is preferably given a cross-sectionally angle-shaped profile and as such, may comprise the complementary top and bottom frame sections 26 and 27 respectively, of which the corresponding ends are spacedly interconnected by a pair of oppositely disposed strut members of angular profile such as 28. This framework provides for a squared fenestration 29 therethrough which is intended to register with the air-flow opening when said framework is superimposed upon the radiator shell.

In the present instance, the profile of these respective frame segments is L-shaped although it might also be made to conform to Z-shape or like modifications. It is intended to form up suitable sheet-metal strips of the desired angular shape which are then cut off into the required lengths. These elements are placed end to end with one profile leg of said L-shape placed in a common plane to constitute an endless brim flange designated 30 (see Fig. 4). The respective appendant other legs of said profile are all disposed in outstanding endwise relationship to one side face of the brim flange to provide an endless web-like flange 31. The abutting ends of the respective segments may be formed up to overlap in the fashion represented in Fig. 5 and of which the seam 32 is thereupon welded or otherwise adjoined. As originally assembled, the brim flange is preferably extended to conform with the rectangular contour shown in dotted outline, and which, subsequent to welding, is trimmed to round off the corner regions and make the brim flange perimeter overlappingly fit the marginal shell bead 25. Said brim flange may be provided with a series of marginal apertures such as 33 serving to receive fastening bolts 34. Each such bolt is separately screwed into a tapped prong-like lug 35 that overhangs the core sheath 22. The two lowermost bolts may cooperate with similar lugs that extend forwardly from the support arm 20.

A trough-shaped slat rack 36 may be detachably secured alongside each of the outstanding legs of the top and bottom frame segments 26 and 27 in the aligned fashion indicated in Fig. 2. A plurality of vertical shutter slats such as 37 are mounted between said complementary racks and given a bow-like transverse profile having end trunnions that align with one slat edge. Said slats may be actuated in unison by any suitable means to open inwardly toward the core. A shroud-like plate 38 may be fixed exteriorly to cover each of the respective frame segments and mask therebehind both the racks and the welded seams 32. This plate is preferably fluted vertically in bow-like profile to correspond with the slat configuration.

As is apparent from Fig. 2, the bottommost contour of the housing wall 14A is cut away and may be made to abut with the similarly bent saddle strap 19 to form an airseal therewith. If desired, oppositely disposed corrugated blinder plates 39 may be permanently installed for the purpose of trimming the shell opening in the event that the shutter frame should be removed, such plates being suitably apertured to permit of freely entering the fastening bolts. It will be observed that my present framework is arranged to wholly confine the shutter installation within the housing extension "E" and that said shutter assembly may be bodily detached without removing the radiator shell, thus providing an advantage over the conventional inbuilt shutters housed within and secured internally of the shell.

Referring now to Figs. 6 and 7, this modified shutter design is more particularly suited to heavy-duty bus and truck purposes. Here the radiator shell 40 is preferably made up as a casting having an inturned flange 41 of which the marginal edge is faced rearwardly toward the core and again provides for a substantially rectangular opening therethrough. This framework is likewise built-up out of relatively heavy sheet-metal or cast strips having an L or Z shaped profile, the strip ends being mitered as at 42 and welded together to constitute an endless brim flange 43 and a rectangularly disposed web-like flange 44 directed inwardly toward the core. If desired, the transverse cross-section of such framework may be given a V profile such as is indicated in Fig. 7. In the present instance, the formation of the frame corner regions is initially kept square as shown in dotted outline at 45 and which corners are preferably rounded off after welding together the frame segments. The perimeter of the trimmed flange 43 is made to telescopically fit into the shell opening in such fashion that said flange stands inwardly somewhat from the plane of the inturned shell flange 41.

It is preferred to correspondingly modify the method of frame securement and to this end, the perimeter of the brim flange 43 is oppositely notched out at as 46 to cooperate with the radially disposed S shaped retaining clip 47. One terminal thereof is shown fixedly secured to the flange, while the outermost end thereof is apertured to receive the screw fastening 48 which in turn is entered into the inturned flange 41. This modified disclosure otherwise conforms to the previously described shutter arrangement and again allows of effecting production economies in building up a framework in relatively small quantities to meet varying requirements in shutter sizes and the like.

The described angular disposition of my reenforcing web extending inwardly from the interior face of the annular flat brim flange along the inner marginal edge thereof, not only serves to impart augmented lateral rigidity to said flange, but also affords convenient means for mounting the slat racks thereon without need of rivets that are likely to mar the exposed trim of my installed framework.

It is thought other advantages inherent in my shutter refinements will be apparent to those skilled in this art, and that changes in the disclosed structural details may be resorted to in likewise carrying out the illustrative embodiments, all without departing from the spirit and scope of my invention heretofore described and more particularly pointed out in the appended claims.

I claim:

1. In a shutter assembly of the detachable type applicable to motor driven vehicles and adapted to control air-flow, the combination with a cellular radiator core provided with a front face, of a shell serving to house said core and having an inturned trim flange whose marginal edge defines an air-flow opening and which flange is extended forwardly beyond the front core face to provide for a clearance space therebetween, an endless framework including a fenestrated brim flange disposed wholly within said shell between the foremost confines thereof and the front core face, said brim flange having its outermost perimeter arranged to overlappingly abut the edge region of the inturned trim flange upon the exterior face thereof and the fenestrated brim flange edge being provided with laterally disposed web means extending inwardly into said clearance space, complementary slat racks spacedly attached to the web means, shutters operatively assembled between said racks, and securing means detachably retaining the assembled framework in the aforesaid abutting relationship for unobstructed bodily removal from the shell in a direction outwardly away from the front core face.

2. In a shutter assembly applicable to motor driven vehicles and adapted to control air-flow, the combination with a cellular radiator core provided with a front face and adjoining end faces, of a shell serving to house said core and having an inturned trim flange whose marginal edge defines an air-flow opening leading to the front core face, a mounting strap associated with certain of the core end faces, a framework including a fenestrated brim flange having its perimeter overlappingly adjoined in an exterior relation to the inturned edge region of the trim flange, shutters operatively assembled in said framework to control the brim flange fenestration, and securing means extending through the brim flange and said air flow opening serving to detachably retain the assembled framework in the aforesaid adjoined relationship, said means including lug means appended to the mounting strap.

3. In a shutter assembly applicable to motor driven vehicles and adapted to control air-flow, the combination with a cellular radiator core provided with a front face of a shell serving to house said core and having an inturned trim flange whose marginal edge defines an air-flow opening communicating with the front core face, a pair of spaced chassis beams serving to support said shell, saddle strap means disposed to bridge the beams beneath said shell and which means are provided with forwardly extending lug means, a shutter framework including a fenestrated brim flange having its perimeter adjoined to the inturned edge region of the trim flange, shutters operatively assembled in said framework, to control the brim flange fenestration, and securing means cooperating with the aforesaid lug of the saddle strap and serving to detachably retain the assembled framework in the aforesaid adjoined relationship.

4. In a demountable shutter assembly applicable to motor-driven vehicles and adapted to control air-flow, the combination with a cellular radiator core, of a shell serving to house said core and having an inturned trim flange whose free edge defines an air-flow opening leading to said core face, a frame carrying shutters disposed to command said opening and which framework includes a fenestrated, endless brim flange provided with a notch-like aperture, clip means fixedly associated with one face of said brim flange and extending through the aperture thereof to reach radially beyond the flange perimeter, and retaining means detachably securing said extended clip portion to the shell.

5. In a demountable shutter assembly applicable to motor driven vehicles and adapted to control air-flow, the combination with a cellular radiator core, of a shell serving to house said core and having an inturned trim-flange whose free edge defines an air-flow opening leading to said core face, a sectional framework carrying shutters disposed to command said opening and which framework includes a fenestrated endless brim flange having its perimeter adjoined to the inturned edge region of the trim flange and further includes web means extending laterally from the fenestrated brim-flange edge, said sectional framework being built-up from a plurality of angular strip-like segments of substantially uniform cross-sectional profile having their respective contiguous ends fixedly united, clip means appended to certain of said segments, and retaining means detachably securing said clips to the shell.

6. In a shutter assembly applicable to motor driven vehicles and adapted to control air-flow, the combination with a cellular radiator core provided with a front face, of a shell serving to house said core and having in inturned trim flange extended forwardly beyond the front core face and the free edge of which flange defines an air-flow opening leading to said core face, a built-up framework including a fenestrated, segmental brim flange having its perimeter adjoined to the inturned edge region of said trim flange and provided with web means extending laterally from the fenestrated brim flange, complementary slat racks secured to the web means, shutters operatively assembled in said racks, detachable retaining means for the brim flange allowing the assembled framework to be bodily removed from the shell, and a shroud plate associated with said brim flange inwardly of the flange perimeter and in overlapping relation to contiguous segments thereof.

7. In a shutter assembly applicable to motor driven vehicles and adapted to control air-flow, the combination with a cellular radiator core provided with a front face, of a shell serving to house said core and having an inturned trim flange extended forwardly beyond the front core face and the free edge of which flange defines an air-flow opening, a framework including a fenestrated brim flange disposed wholly within said shell between the foremost confines thereof and the front core face, said brim flange having its perimeter adjoined to the inturned edge region of the trim flange and being provided with web means extending laterally from the brim flange, complementary slat racks carried by the framework, shutters operatively assembled between said racks, securing means detachably retaining the brim flange in the aforesaid adjoined relationship and allowing the assembled framework to be bodily removed from the shell, and blinder means disposed interiorly of the shell between the front core face and said extended trim flange.

UDO K. JOHANNSEN.